A. GALDYN & S. LUBLIN.
CAR CONSTRUCTION.
APPLICATION FILED DEC. 30, 1914.

1,142,878.

Patented June 15, 1915.
2 SHEETS—SHEET 1.

Witnesses
Inventors
A. Galdyn
S. Lublin
By A. M. Wilson
Attorney

A. GALDYN & S. LUBLIN.
CAR CONSTRUCTION.
APPLICATION FILED DEC. 30, 1914.

1,142,878.

Patented June 15, 1915.
2 SHEETS—SHEET 2.

Witnesses
J. J. Torosiewicz
T. R. Bryant

Inventors
A. Galdyn
S. Lublin

By A. M. Wilson
Attorney

UNITED STATES PATENT OFFICE.

ANDRO GALDYN AND STANISLAW LUBLIN, OF KEWANEE, ILLINOIS.

CAR CONSTRUCTION.

1,142,878.  Specification of Letters Patent.  Patented June 15, 1915.

Application filed December 30, 1914. Serial No. 879,672.

*To all whom it may concern:*

Be it known that we, ANDRO GALDYN and STANISLAW LUBLIN, subjects of the Emperor of Austria-Hungary, residing at Kewanee, in the county of Henry and State of Illinois, have invented certain new and useful Improvements in Car Construction, of which the following is a specification.

This invention relates to new and useful improvements in car construction.

The primary object of this invention is to provide a locking connection between an axle and the wheels positioned at the ends thereof, such construction being especially adapted for better conserving the lubrication of the running gear.

A further object is to provide a journaled car axle with wheels removably fixed at the opposite ends thereof and having such a journaled engagement with the car frame as to serviceably retain the lubricant upon the moving parts, such lubricant being fed onto the journaled axle at a point between the wheels.

With these general objects in view and others that will appear as the nature of the invention is better understood, the same consists in the novel combination and arrangement of parts hereinafter fully described, illustrated in the accompanying drawings and pointed out in the appended claims.

Figure 1:
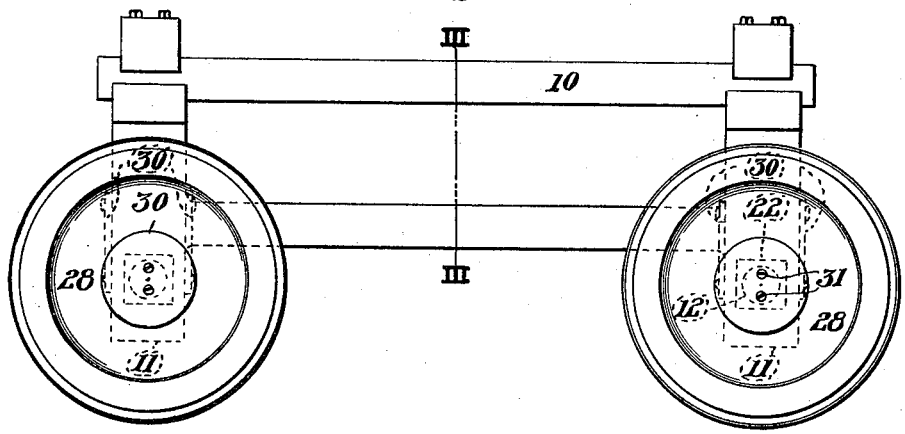
Figure 2:
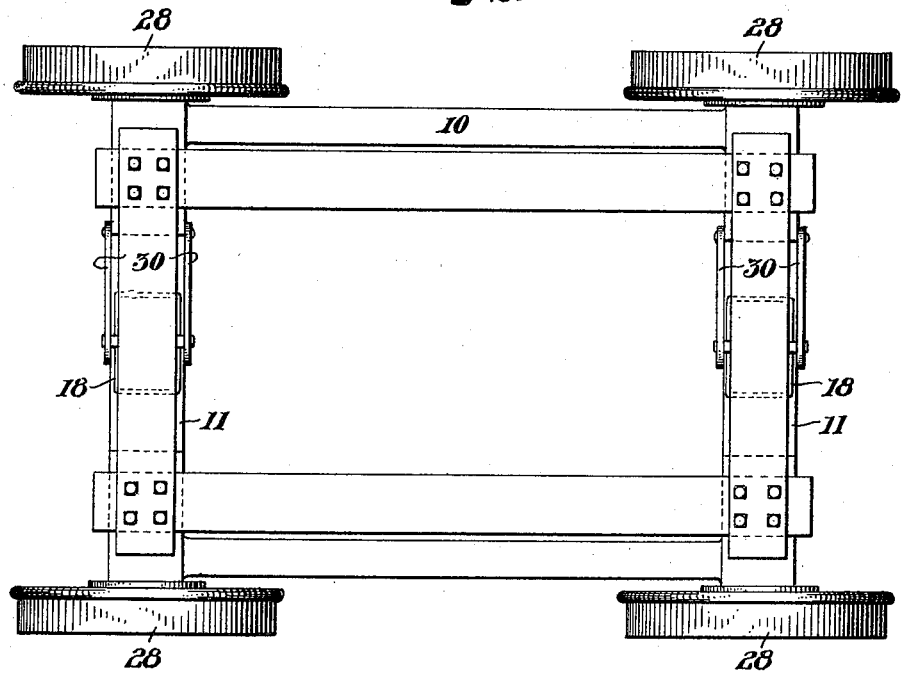
Figure 3:
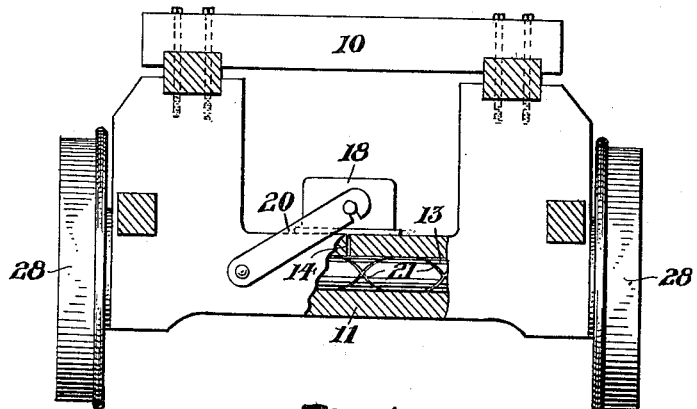
Figure 4:
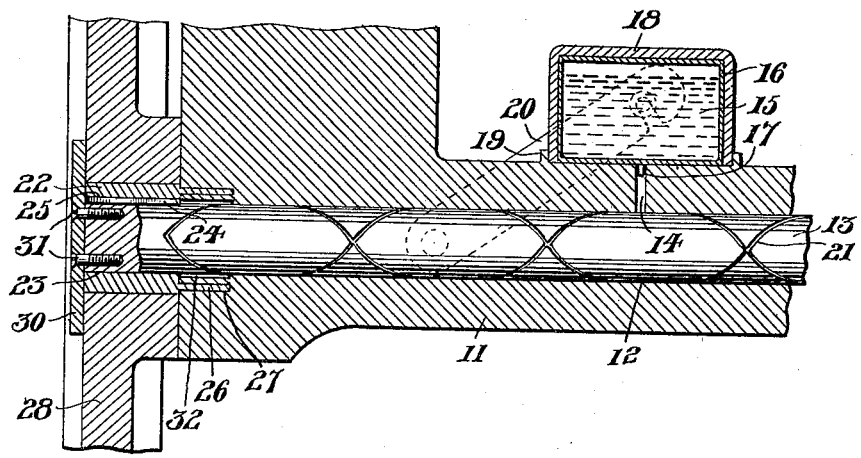
Figure 5:
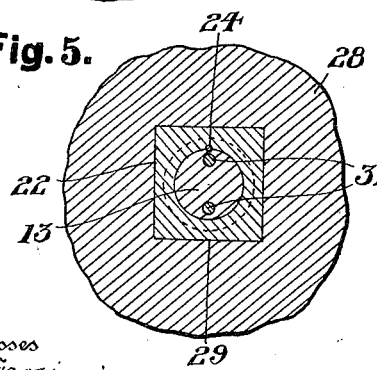
Figure 6:
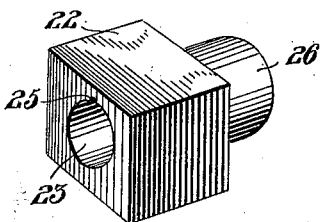

In the drawings forming a part of this application and in which like designating characters refer to corresponding parts throughout the several views:—Figure 1 is a side elevation of a car provided with the present invention. Fig. 2 is a top plan view thereof. Fig. 3 is a vertical central sectional view taken upon line III—III of Fig. 1. Fig. 4 is a vertical central longitudinal section taken through a portion of one of the axle housings and the adjacent portion of the wheel secured to the axle journaled therein. Fig. 5 is a detail vertical sectional view through a portion of the wheel secured to the axle end, and Fig. 6 is a perspective view of one of the wheel securing blocks.

Referring more in detail to the drawings, it will be seen that a car frame 10 is provided having a transversely extending beam or axle housing 11 at each end thereof, such housings being provided with a central bore 12 therethrough for journaling therein the axles such as 13.

The invention being designed for retaining the lubricant in a manner to afford its greatest efficiency in lubricating the axle, the same contemplates its employment with such a system as that herein set forth which provides an oil passage or port 14 vertically positioned through the housings 11 and into which the oil 15 from a tank or can 16 is adapted to feed through an outlet spout or tube 17 of the can which projects into the said port.

A removable casing 18 is fitted over the oil can and seats within a rectangular flange or frame 19 of the housing while a pivoted latch 20 is removably connected to the opposite sides of the casing for removably retaining the casing in its seated position. The oil from the can falling upon the axle 13 is adapted to be conducted to all parts thereof by means of the helical grooves 21 which are provided upon the outer surface of the axle.

Each outer end of the axle is provided with a cubical block 22 mounted thereon by means of a central bore 23 and secured to the axle by a metallic key 24 which is longitudinally slidable within the groove 25 of the block. The block has an inwardly projecting cylindrical collar or sleeve 26 mounted thereon concentric with the block bore, which sleeve is journaled within an annular bearing socket 27 of the adjacent end of the housing 11.

The wheels 28 are each provided with a rectangular opening 29 through the central hubs 33 thereof for closely receiving one of the axle blocks 22 therein while a cap 30 is positioned in flat engagement with the outer faces of the wheel block and adjacent axle end and is secured in place by means of screws 31 projecting through the plate 30 and screw-threaded into the adjacent end of the axle.

From this detailed description of the invention, it will be seen that when the wheel is secured in this manner upon the end of the journaled axle, there will be little loss of the lubricant which is applied in any manner to the bearing surface of the axle and that the present arrangement of mounting the wheel upon the axle retains substantially all of the lubricant within the housing.

It will be understood that the axle end closely fits the bore 23 of the mounting block while a slight annular pocket 32 is provided around the axle at each end of the housing bore. The manner of assembling this wheel structure will be at once apparent, being substantially as hereinbefore described, the block being forced upon the axle end and secured thereon by means of the key 24 and the wheel being closely fitted to the outer surface of the said block, the retaining plate 30 is secured in place. The axle 13 is revoluble within the housing bore 12 and is adequately lubricated through the port 14 while the wheel being secured to the end thereof is turned with a revolving axle, the sleeve 26 freely turning within the annular socket 27.

It will be evident that each of the wheels of the car may be similarly provided with such securing means while the device may be also employed with different forms of vehicles besides cars to which however it is more especially designed.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What is claimed as new is:—

1. A device of the class described comprising in combination with a housing beam having a central longitudinal bore therethrough and having an annular pocket and a concentric annular socket at the open end of the bore, an axle journaled in said bore and having a projecting end, a cubical block having a central bore closely mounted upon the said end, a longitudinal locking key between the said axle end and block, an inwardly projecting sleeve upon said block rotarily mounted within the said housing socket, a wheel having the hub thereof provided with a square opening therethrough and closely receiving the said block therein and a retaining plate secured to the axle end and flatly engaging the said end and the adjacent outer faces of the said block and wheel hub.

2. A device of the class described, comprising an axle housing, an axle journaled therein and projecting beyond the ends of the housing, a block angular in cross-section mounted on each end of the axle and keyed thereto, a wheel mounted on said axle and block, and an end securing plate fastened to said axle engaging said block and wheel.

3. A device of the class described, comprising an axle housing, an axle journaled therein, said housing having a circular recess in each end wall thereof surrounding said axle, an angular block mounted on the ends of said axle, a circular sleeve carried by said block adapted to be received in said recess, a wheel mounted on said block, and retaining means for said wheel.

In testimony whereof we affix our signatures in presence of two witnesses.

ANDRO GALDYN.
STANISLAW LUBLIN.

Witnesses:
 YAN PYRKA,
 RUSSELL T. NEVILLE.

Copies of this patent may be obtained for five cents each, by addressing the "Commissioner of Patents, Washington, D. C."